(12) United States Patent
Mekkaoui Alaoui et al.

(10) Patent No.: US 7,579,399 B2
(45) Date of Patent: Aug. 25, 2009

(54) TOOL CONSISTING OF PLASTIC MATERIAL

(75) Inventors: Mohamed Mekkaoui Alaoui, Hannover (DE); Juergen Vossberg, Wolfsburg (DE); Peter Hochwald, Wehr (DE); Winfried Battermann, Langenhagen (DE)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 613 days.

(21) Appl. No.: 10/520,055

(22) PCT Filed: Dec. 20, 2002

(86) PCT No.: PCT/EP02/14649

§ 371 (c)(1),
(2), (4) Date: Jul. 25, 2005

(87) PCT Pub. No.: WO2004/005385

PCT Pub. Date: Jan. 15, 2004

(65) Prior Publication Data

US 2006/0014881 A1    Jan. 19, 2006

(30) Foreign Application Priority Data

Jul. 9, 2002  (DE) ............... 102 31 001

(51) Int. Cl.
  *B60C 1/00*  (2006.01)
(52) U.S. Cl. ............ 524/492; 524/495; 72/379.2; 72/464
(58) Field of Classification Search .......... 524/492, 524/495
See application file for complete search history.

(56) References Cited

U.S. PATENT DOCUMENTS

| | | | | |
|---|---|---|---|---|
| 5,952,093 A | * | 9/1999 | Nichols et al. | 428/323 |
| 6,147,301 A | * | 11/2000 | Bhatia | 174/388 |
| 6,214,277 B1 | * | 4/2001 | Saigo et al. | 264/443 |
| 6,291,070 B1 | * | 9/2001 | Arpac et al. | 428/412 |
| 6,342,560 B1 | * | 1/2002 | Okel | 524/493 |
| 6,461,732 B1 | * | 10/2002 | Wittmann et al. | 428/412 |
| 6,667,360 B1 | * | 12/2003 | Ng et al. | 524/492 |
| 2003/0153677 A1 | * | 8/2003 | Warth et al. | 525/66 |

FOREIGN PATENT DOCUMENTS

| | | |
|---|---|---|
| CN | 1307074 | 8/2001 |
| CN | 1354198 | 6/2002 |
| DE | 1910705 | 9/1970 |
| DE | 19756790 | 7/1999 |
| DE | 19859298 | 6/2000 |
| DE | 19933819 | 2/2001 |
| WO | WO 01/90241 | 11/2001 |

OTHER PUBLICATIONS www.britannica.com/EBchecked/topic/350437/lubrication/4341/Solid-lubricants.*
http://www.springerlink.com/content/v1605287484 46615/fulltext.pdf.*

* cited by examiner

*Primary Examiner*—David Wu
*Assistant Examiner*—Vu Nguyen

(57) ABSTRACT

The invention relates to a tool consisting at least partially of plastic material and containing nanoparticles which are included into said plastic material. Said tools exhibiting a high pressure and friction resistance, are used in particular as shaping tools, for example for deep drawing of metallic sheets for vehicle bodies.

11 Claims, 4 Drawing Sheets

TOOL CONSISTING OF PLASTIC MATERIAL

CROSS REFERENCES TO RELATED APPLICATIONS

This application is the National Phase of International Application PCT/EP02/014649 filed Dec. 20, 2002 which designated the U.S. and which claims priority to DE Pat. App. 102 31 001.7, filed Jul. 9, 2002. The noted applications are incorporated herein by reference.

The present invention relates to a tool consisting at least partially of plastic material. Recently, the so-called nano-technology has gained importance in various fields of technology. Nanoscale particles are used in nano-technology having a particle size considerably below 1 µm. Due to the size of the particles in the range between $10^{-9}$ and $10^{-6}$ meter, dimensions of atomic structures in solid state systems are obtained which do not comply with the known macroscopic principles. Usually, the particle size of such nano-particles is smaller than the wavelength of short wave visible light (approx. 400 nm) so that these particles cannot be made visible by a conventional microscope anymore. The preparation and handling of such nanoscale particles involve a relatively huge effort. Various interesting technical applications of nanoscale inorganic solid particles have been taken into account, for example their use in coatings for optical elements (cf. DE 41 33 621 A1). In view of the mentioned use, this document deals with the preparation of transparent composite materials, predominantly.

DE 197 46 885 A1 describes a process for the preparation of nano-structured moulded articles and layers starting from a free-flowing mass containing inorganic nanoscale solid particles with polymerizable surface groups, which is placed into a mould and polymerised forming a cured moulded article. No specific applications are mentioned for the so-prepared moulded articles. The option of using said moulded articles, for example as tools for conversion processes, usually made from metal is not taken into consideration in this document.

For example, tools used for conversion processes such as cupping processes or the like often have the disadvantage of a relatively short durability. For example, if stamps, blank holders or matrices being composed of plastic material are used for the cupping of metal parts, a huge abrasion on the contact surfaces results and the material of the tool has the lack of a compression strength being too low. This often leads to a fast failure of the tools.

In contrast, the problem of the present invention is to provide a tool consisting at least partially of plastic material which shows better abrasion properties and has a higher durability.

The solution of this problem provides an inventive tool having the characteristics of the main claim. According to the invention, it is contemplated that the tool consisting at least partially of plastic material contains a portion of nanoscale particles being incorporated into the plastic material. Thus, highly abrasion-improved material properties as well as better frictional properties compared to conventional plastic materials normally result. By using said inventive for conversion processes, the tools have a higher durability and thus, allow the use in a much higher number of working cycles.

The grain size of the nano-particles used according to the invention varies preferably in the range of about 15 and 250 nano-meters. The plastic material prepared by using these nanoscale particles can be provided as casting material or block material. The portion of the nanoscale particles in the plastic material varies in a wide range. Particularly preferred is the use of a ratio between about 5 wt % and about 60 wt % of the nanoscale particles, based on the total weight of the composite material. Preferably, these nanoscale particles are present in the plastic material in a largely homogenously distributed way. The nanoscale particles are embedded into the plastic material in a preferred manner. For achieving a largely homogenous distribution of the nanoscale particles, the nanoscale particles are provided with a surface modifier in the preparation of the composite material. A glass-like amorphous structure is built in the plastic material providing properties which makes the plastic material particularly suitable for the use as tool material, wherein, despite of the glass-like structural properties of the basic mass, said material particularly retains the resilience thereof. Plastic materials to be considered as basic mass are in particular polyurethanes, epoxy resins or plastic materials with comparable properties.

Predominantly, the nanoscale particles to be considered within the scope of the present invention are particles of inorganic substances. For example, these can be metal oxides. Depending on the intended use, metal oxides with sufficient hardness and/or rubbing fastness are preferred, for example silicon oxides, titanium oxides or the like.

In the context of the present invention tests have been conducted, wherein mixtures of plastic material containing nanoscale particles have been compared with plastic materials containing other additives, wherein the plastic materials containing the nanoscale particles according to the invention have been shown to be particularly preferred with respect to different properties, in particular with respect to abrasion properties, compression strength and rubbing fastness. In the context of these tests, REM recordings of different samples of plastic materials have been made under addition of nanoscale particles on one hand and conventional fillers on the other hand, respectively, and it has been shown that these additives are present in the plastic material matrix with different distributions of the particles. In some tests, it has been shown that inhomogeneity and lumpings already occurred during agitation of the not yet solidified materials. When curing the samples, it has been found that many inclusions of air are present in the plastic material. If in contrast the nanoscale particles are embedded into the plastic material using suitable surface modifiers, a much better distribution of the nanofine particles in the plastic material matrix can be observed. It is assumed that an amorphous solid is built by embedding the inventive nanoscale particles into the plastic material, wherein the surface of the solid nano-particles is wetted by the plastic material matrix. It appears that a tight bonding is created between the two phases. Also, this assumption is confirmed by REM recordings of samples of the inventive material, which has been immersed into a nitrogen solution and broke up. Plain surfaces and no particle pikes can be discovered near the fractured surface.

Within the scope of the inventive tests, the E-module and the compression strength of plastic materials with nanoscale particles according to the invention on one hand and plastic materials with conventional powdered particles on the other hand have been examined and compared. The addition of for example about 20% of nanoscale particles has already led to a considerable higher compression strength compared to plastic materials containing conventional fillers solely.

Tools have been made using the inventive plastic materials and cupping test have been conducted with said tools. Thereby, it has been discovered that both the dimension accuracy and the tool life of the cupping tools are highly improved. Normally, such plastic material tools are worn relatively fast. By embedding the nanoscale particles in an amount of for example about 20 wt %, based on the total weight of the composite material, better friction and abrasion conditions could be achieved. By embedding further gliding materials such as for example graphite or molybdenum sulfide, the abrasion and the cupping behaviour of the tools could be further improved, as can be seen from the following embodiments.

The inventive plastic material tools having embedded nanoscale particles have the advantage that the material costs are considerably lower (for example up to 70%) compared to conventional steel tools. These tools can be better processed and thereby need a minor mechanical effort. This leads to a decreased need of energy and power in the machine work. The inventive plastic material tools have a shorter period of vocational adjustment than steel tools. They have a considerably lower weight. For example, weight reduction of up to 60% can be achieved, whereby the load of for example crane equipments in handling of the tools can be decreased.

The inventive plastic material tools and plastic material inserts for tools made thereof, respectively, can be easily modified involving also savings in costs, energy and time. Disused tools can be re-used completely, for example as fillers for new plastic material tools, so that the costs for waste disposal do not apply. As the plastic material tools show an elastic behaviour, an improvement in quality in materials converted by such conversion tools can be achieved. In particular, the friction properties of cupping processes are improved by adding further substances with gliding properties. Thus, liquid lubricants which have been necessary up to now can be omitted, whereby the conversion process is getting more environmentally friendly.

Further, the present invention relates to a process for converting work pieces, in particular metal parts, using a converting tool consisting at least partially of plastic material, wherein the converting tool contains a portion of nanoscale particles embedded in the plastic material according to the invention. According to a preferred embodiment of the invention said conversion tool is used as cupping tool for a process of cupping sheet metal, in particular of body parts or bodies for cars.

Subsequently, the following invention is described in more detail by means of embodiments with reference to the accompanied figures.

Within the scope of the present invention different batches of plastic materials have been examined, wherein nanoscale particles with different grain sizes have been added thereto. The properties of the examined samples P-D4, P-b1, P-b2 and P-b3 of nanoscale particles are shown in the following Table 1.

TABLE 1

| Properties | Nano-particles | | | |
| --- | --- | --- | --- | --- |
| | P-D4 | P-b1 | P-b2 | P-b3 |
| Content of nano-particles [%] | 99.00 | 94.80 | 94.70 | 96.60 |
| Water solubility [%] | 0.150 | 0.007 | 0.010 | 0.007 |
| Loss on ignition [%] | — | 3.3 | 3.5 | 3.0 |
| Moisture content | — | 0.38 | 0.33 | 0.40 |
| pH-Value of suspension in water | 9 | 10.8 | 8.5 | 5.7 |
| Specific surface BET [$m^2/g$] | 3 | 51 | 50 | 29 |
| Grain size [nm] | 800 | 28 | 28 | 47 |
| Average particle diameter: After laser defraction [μm] | — | 3.5 | 8 | 0.14 |
| According to x-ray defraction [nm] | — | 28 | 28 | 47 |

As can be seen from the table, the grain size of the sample P-D4 was 800 nm whereas the grain size of the other nanoparticles was essentially smaller. The nanoscale particles have been provided with surface modifiers and have been added to a plastic material mass. In tests with the sample P-D4, inhomogeneities occurred already during agitation and lumping occurred. During curing of the samples it has been discovered that numerous inclusions of air are present in the plastic material.

Figure 1:
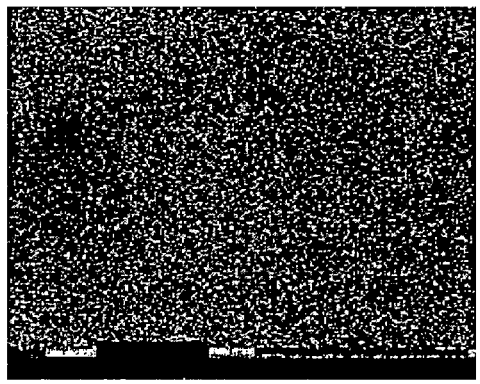
FIG. 1 shows a REM recording of a cut through a plastic material for the inventive tool according to a first sample P-b1.
Figure 2:
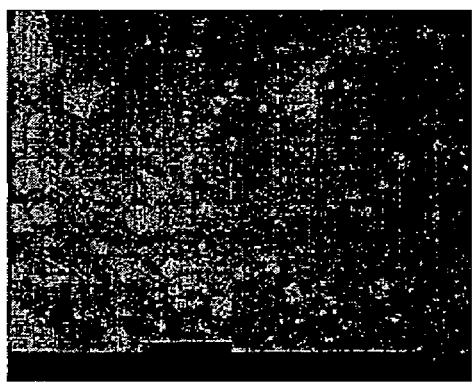
FIG. 2 shows a further REM recording of the same sample as in FIG. 1, however, with a higher magnification.

In contrast, it has been discovered that an essentially improved distribution of the nanofine particles in the plastic material matrix has been achieved with the samples having the nanoscale particles which have shown an essentially smaller grain size according to the Table. This was confirmed by corresponding REM recordings. FIG. 1 shows a REM recording of a cut through the plastic material for an inventive tool according to the sample P-b1, which is shown in the second column from the left in Table 1. In FIG. 1 the even distribution of the nanoscale particles in the plastic materials can be seen. FIG. 2 shows the corresponding REM recording of the same sample, however, with a higher magnification.

Figure 3:
FIG. 3 shows a REM recording of a fractured surface of a sample of an inventive plastic material which is immersed in a nitrogen solution and broke up.

In testing the material properties of a plastic material containing nanoscale particles, one sample of the batch P-b1 (cf. Table 1) was immersed in a solution of liquid nitrogen and subsequently broke up. FIG. 3 shows a REM recording of the fractured surface of such a sample. It can be seen that two plain surfaces are present at the fractured surface and no particles tips can be seen. Hence, one can assume a tight bonding which has been created between the nanoscale powder and the plastic material matrix.

Figure 4:
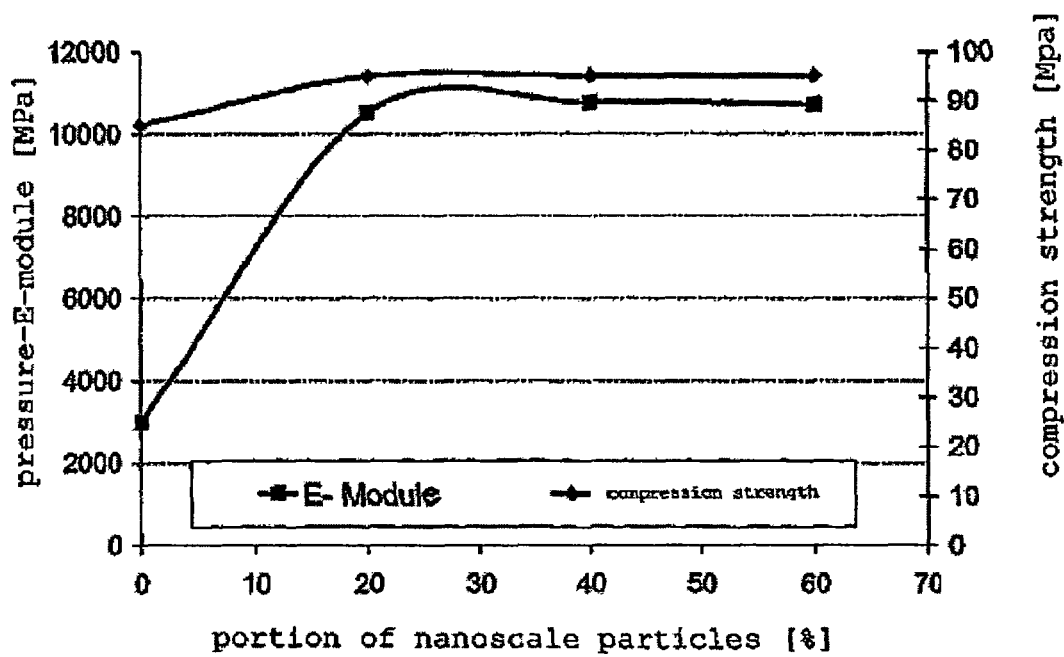
FIG. 4 shows a graphic illustration of the E-module and the compression strength using different sized portions of nanoscale particles in plastic materials.

For testing the suitability of the inventive plastic materials as tool material, different material characteristics have been determined, in particular the pressure-E-module [MPa] and the compression strength [MPa] of the plastic materials and have been shown in the graphic illustration according to FIG. 4. Thereby, the portion of nanoscale particles in the plastic material increases in the graphic from left to the right. It can be learned from the graphic that a considerable increase of the material stiffness by addition of about 20% nanoscale particles has been achieved with both characteristics, in particular with the elasticity module. Further tests show that with the additional use of conventional fillers a further considerable increase of the value of the E-module and an increase of the compression strength can be achieved.

Figure 5:
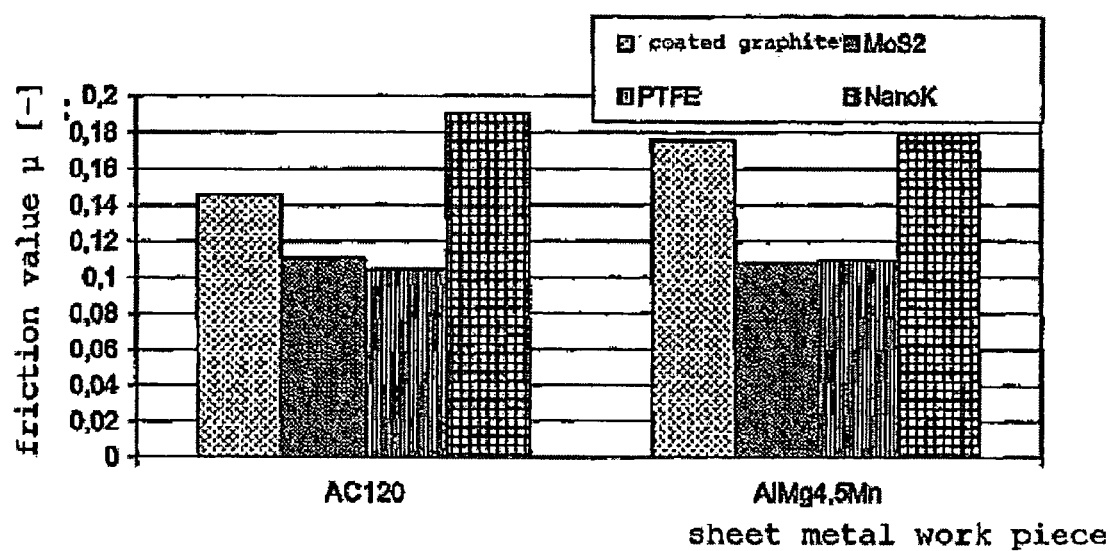
FIG. 5 shows a graphic illustration of the friction values using the plastic material cupping tools containing different fillers.
Figure 6:
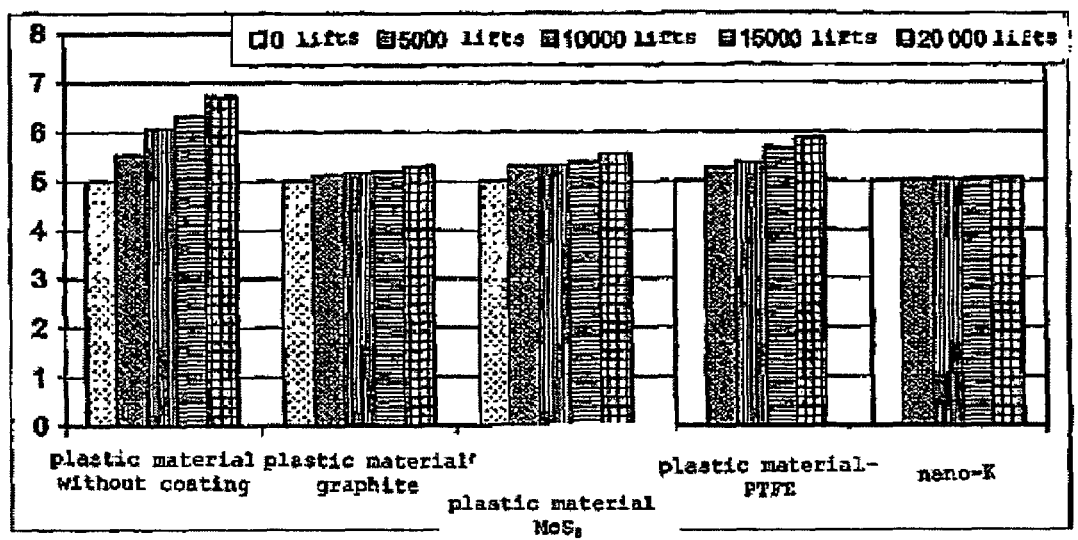
FIG. 6 shows a graphic illustration demonstrating the abrasion behaviour of plastic material tools with different fillers in cupping with an increasing number of lifts.

Within the scope of the present invention, friction tests have been conducted wherein different sheet metal materials have been cupped by means of tools prepared from inventive plastic materials having a portion of nanoscale particles on the one hand and from comparative plastic materials having a portion of a material with gliding properties on the other hand. The results are shown in FIG. 6. Thereby, the cupping results for two different sheet metal materials, namely AC 120 and a sheet metal of an aluminium magnesium alloy AlMg4.5Mn have been illustrated, wherein in both cases cupping tools of four different plastic materials have been examined. In both illustrations, the column on the left side corresponds to the friction value for one plastic material which contains graphite as material with gliding properties. Thereafter, seen from left to right, a plastic material containing molybdenum sulfide as material with gliding properties follows, thereafter, seen from left to right, a plastic material with a portion of PTFE follows and finally, the rightmost column follows, showing a plastic material having a portion of inventive nanoscale particles. The friction results illustrated in FIG. 5 show that, in both cases, the inventive plastic material having an average friction value of approx. 0.19 has the best properties with respect to abrasion. In particular, it is astonishing that a better abrasion strength results by addition of the nanoscale particles than by addition of conventional additives to the plastic material known for their gliding properties.

In a further test, the abrasion behaviour of plastic material tools having different fillers has been examined by cupping sheet metals with a large number of consecutive lifts using the tools consisting of these plastic materials. The result is shown in the graphic illustration according to FIG. 6. In each case, the relative abrasion strength is shown resulting in comparison with an initial value at the beginning of the test. Five columns are shown for each of the tested materials, wherein the respective column on the left side corresponds to the initial value (relative scale 5) and thereafter the value after 5.000 lifts, 10.000 lifts, 15.000 lifts and 20.000 lifts follows from left to the right. It can be seen from the illustration according to FIG. 6 that the abrasion strength of the tool having a plastic material without nanoscale particles and having no plastic materials with gliding properties is getting worse with an increasing number of lifts. The second column results from a test using a plastic material with embedded graphite. The third column (from the left) illustrates the values for a plastic material having an molybdenum sulfide additive. The fourth column (from the left) illustrates the values for a plastic material having an embedded PTFE as material with gliding properties. Finally, in the fifth column (in the illustration on the right side) the values for a plastic material tool with nanoscale particles are illustrated. It can be seen that, by embedding an additive with gliding properties, the values for the abrasion strength are deteriorating more or less but wherein the deterioration is less than if the plastic material contains no additive as can be seen by comparison of the column on the left side of the drawing. In contrast, the abrasion values of the inventive plastic material tool having embedded nanoscale particles (nano-K) remain constant after 20.000 tool lifts.

Within the scope of the present invention model tools have been made wherein stamps have been made out of different plastic materials having nanoscale particles according to the invention and with conventional additives, respectively, wherein the tool had radii in certain areas. These areas, for example border areas of the tool, had been measured as critical areas for the abrasion behaviour after cupping of 100 parts in each case, respectively. It has been discovered that a stamp that has been made out of the plastic material containing nanoscale particles according to the invention showed the best abrasion behaviour, as the least redundant differences at the radii arose.

The invention claimed is:

1. A tool which consists of a plastic material with nanoscale particles and a material with gliding properties embedded in the plastic material and wherein the tool is in the form of a forming tool.

2. The tool of claim 1 wherein the plastic material is provided as block material or casting material.

3. The tool of claim 1 wherein the nanoscale particles have a particle size substantially in the range between about 15 nm and about 250 nm.

4. The tool of claim 1 wherein the nanoscale particles are present in an amount of between about 5 weight % and about 60 weight % based on the total weight of the plastic material.

5. The tool of claim 1 wherein the nanoscale particles are widely homogeneously distributed in the plastic material.

6. The tool of claim 1 wherein the nanoscale particles contain a surface modifier.

7. The tool of claim 1 wherein the plastic material has a glasslike amorphous structure.

8. The tool of claim 1 wherein the material with gliding properties is present in an amount of between about 10 weight % and about 60 weight % based on the total weight of the plastic material.

9. The tool of claim 8 wherein the material with gliding properties is selected from the group consisting of graphite and molybdenum sulfide.

10. The tool of claim 1 wherein the plastic material is a polyurethane or an epoxy resin.

11. A method for converting a metal work piece using a tool wherein the tool consists of a plastic material with nanoscale particles and a material with gliding properties embedded in the plastic material and wherein the tool is in the form of a forming tool.

* * * * *

UNITED STATES PATENT AND TRADEMARK OFFICE
CERTIFICATE OF CORRECTION

PATENT NO. : 7,579,399 B2  Page 1 of 1
APPLICATION NO. : 10/520055
DATED : August 25, 2009
INVENTOR(S) : Mekkaoui Alaoui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 870 days.

Signed and Sealed this

Fourteenth Day of September, 2010

David J. Kappos
*Director of the United States Patent and Trademark Office*